United States Patent [19]
Brennen et al.

[11] B 3,989,991
[45] Nov. 2, 1976

[54] METHOD AND CIRCUIT FOR THE DERIVATION OF AN ANALOG SLIP FREQUENCY SIGNAL OF AN INDUCTION MOTOR IN A TACHOMETERLESS MOTOR DRIVE

[75] Inventors: Michael B. Brennen; Alberto Abbondanti, both of Pittsburgh, Pa.

[73] Assignee: Westinghouse Electric Corporation, Pittsburgh, Pa.

[22] Filed: Oct. 3, 1974

[21] Appl. No.: 511,886

[44] Published under the second Trial Voluntary Protest Program on February 3, 1976 as document No. B 511,886.

[52] U.S. Cl. ............................................. 318/231
[51] Int. Cl.² ............................................. H02P 7/42
[58] Field of Search .................... 318/227, 230, 231

[56] References Cited
UNITED STATES PATENTS

| | | | |
|---|---|---|---|
| 3,500,158 | 3/1970 | Landau et al. | 318/227 |
| 3,512,067 | 5/1970 | Landau | 318/227 |
| 3,593,083 | 7/1971 | Blaschke | 318/227 |
| 3,718,847 | 2/1973 | Graf et al. | 318/227 |
| 3,775,652 | 11/1973 | Bowler et al. | 318/227 |
| 3,824,437 | 7/1974 | Blaschke | 318/227 |

Primary Examiner—Gene Z. Rubinson
Attorney, Agent, or Firm—C. M. Lorin

[57] ABSTRACT

A tachometerless motor drive of the induction motor type is obtained by synthesizing the motor slip frequency from analog signals sensed at the input of the motor. The slip frequency signal so derived is used as one of the parameters for control, beside voltage and/or frequency or current and frequency at the input of the motor.

Analog circuitry is used involving the derivation of a numerator N characteristic of $E_1 I_1 \cos \theta$, where $E_1$, $I_1$ and $\theta_1$ are given by the vectorial representation of the input current and voltage, and of a denominator $D = E_1^2/\omega_1$
where $\omega_1$ is the frequency of the motor supply.

5 Claims, 15 Drawing Figures

METHOD AND CIRCUIT FOR THE DERIVATION OF AN ANALOG SLIP FREQUENCY SIGNAL OF AN INDUCTION MOTOR IN A TACHOMETERLESS MOTOR DRIVE

CROSS-REFERENCE TO RELATED APPLICATION

The present application is related to the following patent application which is assigned to the same assignee as the present application: Ser. No. 448,315 filed Mar. 5, 1974 in the name of Alberto Abbondanti for "Flux Control Systems For Controlled Induction Motors."

BACKGROUND OF THE INVENTION

The invention relates to induction motor drives in general, and more particularly to an improved mode of deriving information relative to the motor slip frequency with a view of optimizing performance and control of a motor drive.

Since the adjunction of solid state motor control the induction motor has become the ideal motor for a drive because of its ruggedness and simplicity. While maximum motor efficiency and optimal drive control require knowledge of a number of operative parameters of the motor, in the induction motor the only readily available ones are the voltage applied to the stator and the stator and motor currents. Without more, though, it is not possible to ascertain what portion of the current is allocated to building of the flux for stator-rotor coupling and what portion actually delivers power on the shaft to meet the torque. In that respect the slip frequency of the motor, (e.g. the difference in angular velocity existing, in the presence of a torque, between the rotation in space of the electrical vector representing the magnetomotive force of the stator and the angular rotation of the driven shaft) constitutes an important performance characteristic of the motor. In particular, there exists an univocal relationship between the slip frequency and the stator current for a given flux and torque, regardless of the other electrical or mechanical quantities. Therefore, knowledge of the slip level and of the stator current is sufficient to completely characterize the behavior of the motor.

When the induction motor is used in conjunction with variable frequency power supplies, such as solid state inverters or cycloconverters, it is important to know the slip of the motor at any instant in order to be able to control the static and dynamic behavior of the drive. First, knowledge of the slip gives a measure of how to compensate for the natural droop in speed with load which is characteristic of an induction motor. As a result close speed regulation is made possible. Secondly, the knowledge of the slip permits an optimal control of the drive, mainly the magnitude (and sign) of the generated torque and the degree of excitation of the machine, e.g. the flux level, since as mentioned above the slip reveals univocally these two parameters.

In the prior art the slip has been measured by mechanical or electromechanical rotary devices coupled to the motor shaft, and such measurement has been used to improve the dynamic performance of a drive. (See for instance F. Blaschke and G. Huetter, "Inverter for Control of Induction Machines in Motoring and Regenerative Drives", in ETZ-A (Germany) Vol. 89 (1968), part 5, pp. 108–112. See also P. G. Cushman and A. A. Clark, "Co-ordinated Voltage Control for Induction Servomotors," U.S. Pat. No. 3,700,986, October, 1972.)

In particular, it is known to feedback a signal indicative of the slip for controlling a "current fed" inverter drive, also called adjustable current input drive (ACI). See for instance K. P. Phillips, "Current Source Converter for AC Motor Drives," IEEE Conference Record of IGA/1971 Meeting, pp. 385–392. See also M. B. Brennen, "A Comparative Analysis of Two Commutation Circuits for ACI Inverters Feeding Induction Motors," IEEE Conference Record of PESC/73 Meeting, pp. 201–212. In such instances the inverter circuit routes the current generated by the front end converter, or chopper, through the motor windings, at a controlled sequence and frequency. This current is regulated by converter control in response to the level of the slip in order to achieve a programmed interdependence between stator current and slip level. The regulation program can be chosen to achieve under any load situation and at any output frequency, a desired level of flux, usually the nominal flux defined by the machine nameplate voltage and frequency.

The usual means by which a slip signal is obtained is through the use of electromechanical rotary transducers coupled to the motor shaft. The simplest arrangement, commercially used in ACI drives, is a tachometer coupled to the shaft for deriving induction of the shaft speed. The tachometer signal subtracted from the analog frequency command to the inverter yields information on the slip. This method requires the use of a rather precise tachometer, since even small relative errors between the two terms of the subtraction greatly affect the difference. In particular, the tachometer introduces a ripple which can be too important when fast loop response is desired. Pulse tachometers have been used implementing the subtraction digitally and thus eliminating problems of inaccuracy. Differential electromechanical transducers (See: T. M. Corry "Triggering Circuit for a Controlled Rectifier," U.S. Pat. No. 3,413,493) or even geared differential mechanisms (See: P. D. Agarwal "The General Motors High Performance Induction Rotor Drive System" IEEE Transactions on Power Apparatus and Systems, Vol. PAS-88 No. 2 pp. 86–93 (1969) have been considered as a substitute solution. Such systems, however, have two major drawbacks. First, they impair the mechanical interface between the motor and the load by interfering with the requirements of tight coupling or close spacing in the mechanical layout, or by requiring the adjunction of undesirable gear trains or belts. Secondly, they generally require the use of additional organs such as brushes, slip rings, light sources which introduce in the drive system a weak link from the viewpoint of overall reliability. In short, such systems lack the simplicity and ruggedness which are the most attractive qualities of an AC motor drive. A method by which a signal proportional to the motor slip frequency would be derived without the use of any rotary transducers of any sort is therefore highly desirable.

The main object of the present invention is to provide an induction motor drive in which an indication of the slip is derived at all times only by electrical circuitry, thus involving no mechanical or electromechanical device, nor the adjunction of any contrivance between the stator and rotor or on the driven shaft of the motor.

Another object of the present invention is to provide an improved mode for deriving an indication of the slip of an induction motor.

A further object of the present invention is to derive a slip signal of an induction motor drive through analog sensing of the currents applied to the stator and the currents flowing in the stator of the induction motor and through analog circuitry combining the sensed signal.

Still another object of the present invention is to provide an improved static controlled motor drive of the induction motor type in which the slip frequency of the motor is used as a control parameter.

SUMMARY OF THE INVENTION

The invention proposes a method and an analog circuit for obtaining a slip signal through analog signal processing using only the motor electrical quantities available by sensing, in a static controlled induction motor drive. The stator voltages and stator currents, their phases and frequency are measured, and the analog quantities so obtained are combined in an analog circuitry to generate a synthesized signal which is representative of the instantaneous slip of the running motor. Thus, the slip is measured without the use of transducers of any kind which otherwise would have to be coupled on the shaft of the motor.

BRIEF DESCRIPTION OF THE PRIOR ART

Figure 1:
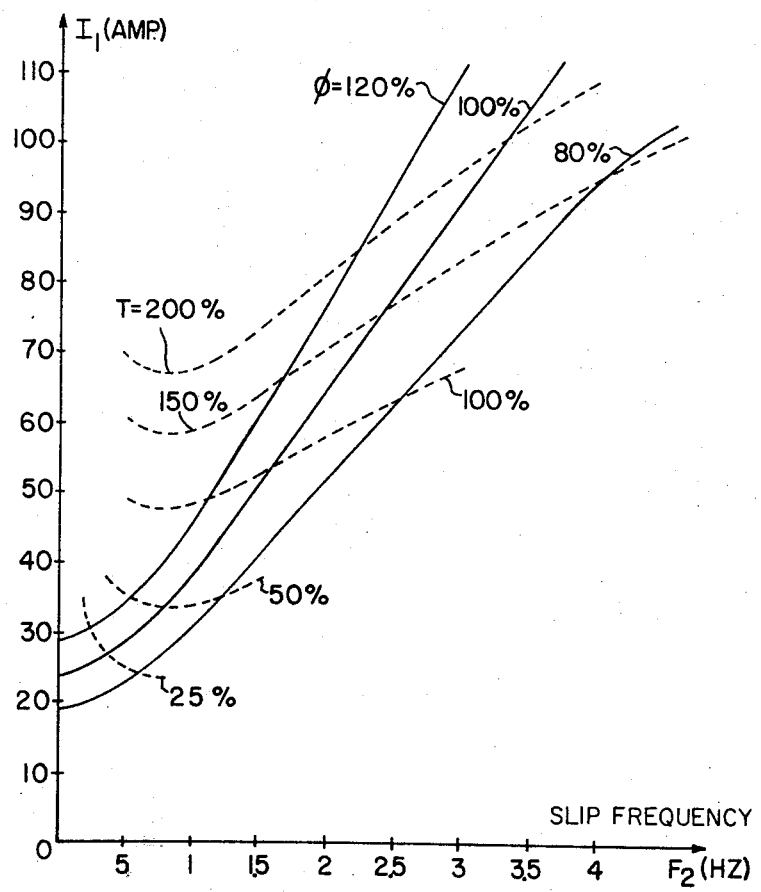
FIG. 1 is a graph showing how the knowledge of the slip frequency and of the stator current defines the flux level of an induction motor drive and the generated torque.

FIG. 1 shows families of curves which can be plotted for any type of induction motor. They are intended to show how the knowledge of the slip signal provides a precise indication of two parameters which are critically important in implementing optimal control of an induction motor drive. These parameters are the magnitude and sign of the generated torque and the flux level, or degree of excitation of the motor. The graphs of FIG. 1 are based on the fundamental equations of an induction motor and the values of the electrical parameters in the equivalent diagram.

These graphs relate the motor slip frequency (horizontal axis) to the amplitude of the stator circuit (vertical axis). A first family of curves (solid lines) defines the motor flux Level $\phi$, in percent of the nameplate value. Knowing simultaneously the slip frequency and the current amplitude, one locates a point in the graph. The flux $\phi$ curve passing at this point indicates the flux level, irrespective of actual load, voltage or frequency. Similarly, a second family of curves (dotted lines) defines the torque magnitude in percent of the rated torque. Again, if the slip frequency and the stator current amplitude are known, a point on the graph is defined and the torque T curve passing through this point univocally defines the torque level, regardless of the other electrical or mechanical quantities. This shows that information on the slip level, and the stator current level, is sufficient to completely characterize the motor conditions. A number of control schemes for AC drives have taken advantage of this fact in order to improve the dynamic performance of the drive. In other instances the slip signal is not only desired but necessary to the operation of the drive. This is the well-known "current fed" inverter drive, or adjustable current input drive (ACI) (see the above-mentioned reference to K. P. Phillips).

Figure 2:
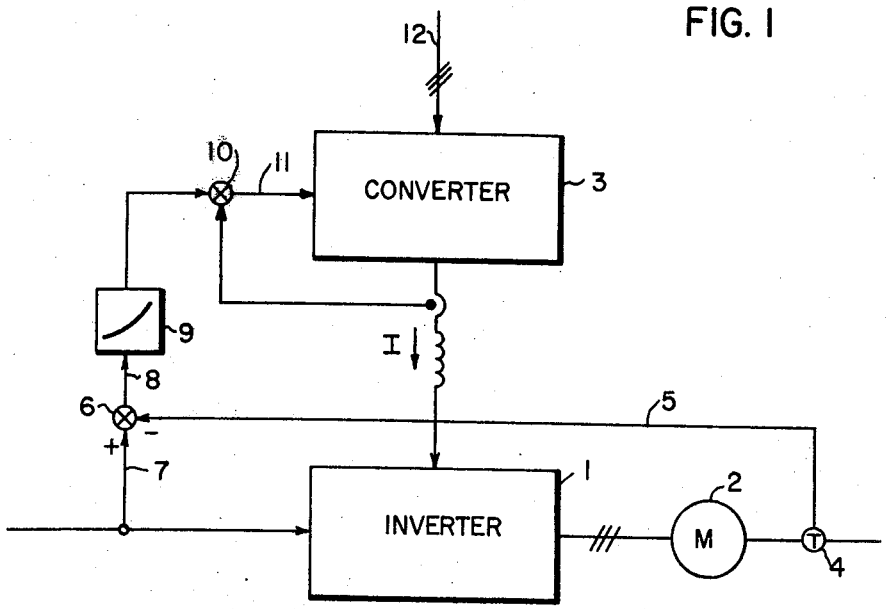
FIG. 2 shows the basic circuit of a current fed ACI drive.

FIG. 2 illustrates the basic control circuit of such a drive. The inverter circuit 1 routes through the windings, of the motor 2, at a controlled sequence and frequency, the current I generated by a front end converter 3 (or chopper). A tachometer 4 provides an indication of the speed on the shaft of motor 2. The speed signal via line 5 is subtracted at 6 from the frequency reference signal received via line 7 which corresponds to the motor stator frequency.

Thus, on line 8 the slip signal is derived from the summer 6. In conformity with the graph of FIG. 1, a current reference I* is derived from block 9. The current reference is compared at 10 with the current I effectively controlled by the inverter 1, and the control signal, on 11, is used to control the converter 3 which generates a DC voltage after conversion from the three-phase line 12. The current is regulated by controlling the converter 3 in response to the level of slip in order to achieve a programmed interdependence between stator current and slip level. The regulation program is chosen, as indicated on FIG. 2, to conform to the graph of FIG. 1 so as to achieve under any load situation and at any output frequency by the machine nameplate voltage and frequency.

Such control circuit typical of the prior art, requires a tachometer and a feedback signal in order to have a slip signal available for control purposes. In contrast, the present invention derives an indication of the slip level without the need of an additional device mounted on the motor, be it mechanical or electromechanical. By eliminating shaft coupled rotary transducers the invention improves the overall reliability of the drive system, reduces the overall cost and simplifies the motor-load mechanical interface.

GENERAL CONSIDERATIONS REGARDING THE INVENTION

The basic idea consists in obtaining an indication of the slip level from analog signal sensing and signal processing techniques, the only electrical quantities involved in the process being the stator voltages, the stator currents and their phases and frequency, as supplied by the converter to the motor.

The derivation of a slip representative signal from motor input quantities is based on the following considerations of the motor theory.

Given an induction motor represented by the equivalent diagram of FIG. 3, the relationship between motor torque $T$ and slip angular frequency is as follows:

$$T = k \; \frac{E_1^2}{\omega_1^2} \cdot \frac{1}{\frac{R_2}{\omega_2} + L_2^2 \frac{\omega_2}{R_2}} \text{(joule)} \quad (1)$$

where $k$ is a dimensionless coefficient related to the number of poles of the stator and the number of stator phases, $E_1$ is the peak value of the air gap voltage, $R_2$ is the rotor resistance, $L_2$ is the rotor leakage inductance, $\omega_1$ the stator angular frequency and $\omega_2$ the slip frequency.

Expanding the expression in a Taylor series with respect to the variable $\omega_2/R_2$ and stopping the development at the first term, equation (1) becomes:

$$T = k \; \frac{E_1^2}{\omega_1^2} \cdot \frac{\omega_2}{R_2} \quad (2)$$

Expression (2) is valid for values of $\omega_2$ small enough to fulfill the condition $$\omega_2 << (\omega_2^*)^2 \quad (3)$$

where $\omega_2^*$ is the pull-out slip at the considered flux value.

It can be shown that in practice over a reasonable range of loads, when the motor flux value is maintained close to its nominal value over the range of operating frequencies, condition (3) is generally satisfied and therefore expression (2) represents a valid approximation of the torque-slip relationship.

Figure 4:
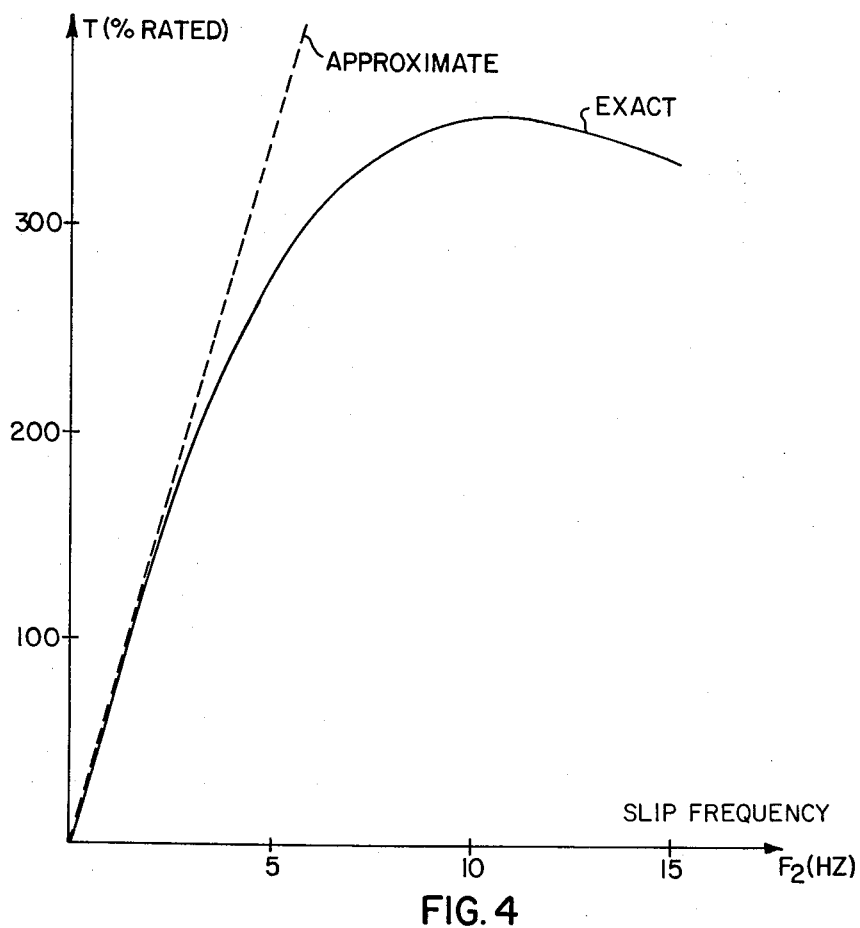
FIG. 4 illustrates the exact and approximate torque-slip characteristics of an induction motor.

FIG. 4 illustrates the validity of such approximation. FIG. 4 represents curves corresponding to the exact and to the approximate torque-slip relationships computed for a typical motor from expressions (1) and (2), respectively.

From expression (2), the following expression of the slip frequency is derived:

$$\omega_2 = \frac{R_2}{k} \cdot \frac{T \omega_1^2}{E_1^2}$$

which can be arranged to read $$\omega_2 = R_2 \; \frac{\frac{T \omega_1}{k}}{\frac{E_1^2}{\omega_1}} = k' \; \frac{N}{D} \quad (4)$$

where, $k' = R_2$, and is therefore a known motor constant, and $$N = \frac{\omega_1 T}{k}, \quad D = \frac{E_1^2}{\omega_1}$$

It appears that both terms $N$ and $D$ can be obtained from a computation based on analog signals sensed on the motor and that a signal proportional to the slip frequency can be derived from dividing $N$ by $D$. Referring to the equivalent diagram of the motor shown in FIG. 3, it is observed that the voltage $E_1$ is directly related to the motor input voltage and current by the relationship:

$$E_1 = V_1 - I_1 (R_1 + jW_1 L_1)$$

Therefore, the term $D = E_1^2/W_1$ can be obtained from the motor input quantities, $V_1$, $I_1$, $\omega_1$, and the motor known parameters $R_1$ and $L_1$.

Figure 3:
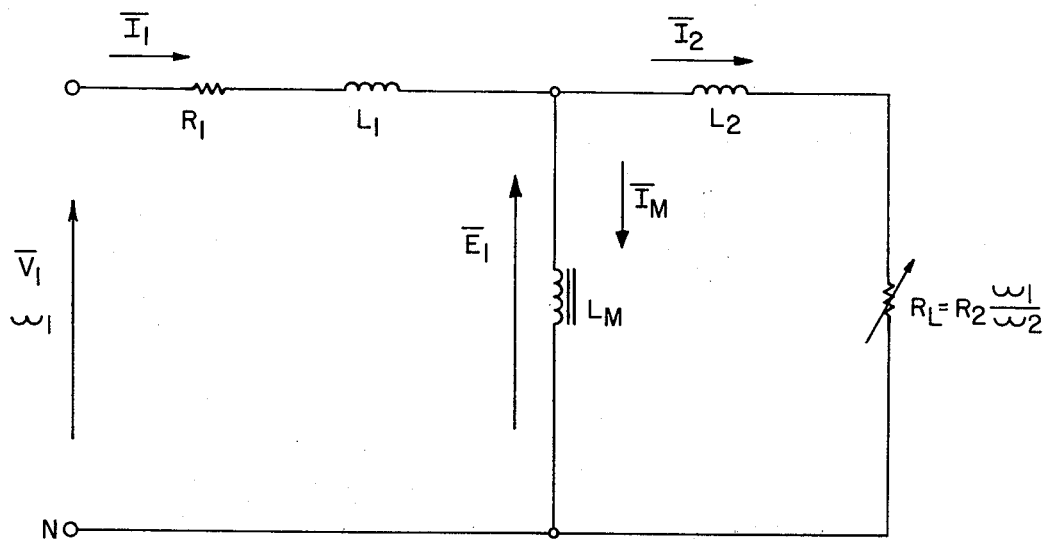
FIG. 3 shows the equivalent electrical circuit of an induction motor.

As far as N is concerned, this term is related to the motor input quantities by the relationship $$N = \frac{\omega_1 T}{k} = E_1 I_1 \cos\theta_1 \quad (5)$$

in which $\theta_1$, is the angle between vectors $E_1$ and $I_1$ of FIG. 3.

Figure 5:
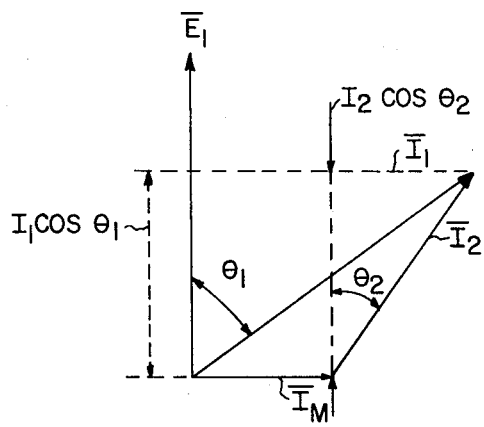
FIG. 5 shows the phasor diagram of the equivalent circuit of FIG. 3.

In order to prove relation (5), reference is made again to the motor equivalent electrical circuit of FIG. 3 and to the corresponding phasor diagram of FIG. 5. It is known from FIG. 3 that $$I_2 = \frac{E_1}{[\omega_1^2 L_2^2 + R_L^2]^{1/2}}$$

and $$\cos\theta_2 = \frac{I_2 R_L}{E_1} = \frac{R_L}{[\omega_1^2 L_2^2 + R_L^2]^{1/2}}$$

Therefore $$E_1 I_2 \cos\theta_2 = \frac{E_1^2 R_L}{\omega_1^2 L_2^2 + R_L^2}$$

but $R_L = R_2 (\omega_1/\omega_2)$. Moreover, from FIG. 3 the following relationship can be written:

$$E_1 I_2 \cos\theta_2 = \frac{1}{\omega_1} \cdot \frac{E_1^2}{L_2^2 \frac{\omega_2}{R_2} + \frac{R_2}{\omega_2}}$$

Comparing this expression with equation (1), it is seen that:

$$E_1 I_2 \cos\theta_2 = \frac{T \omega_1}{k}$$

On the other hand, from the diagram of FIG. 5,
$I_2 \cos\theta_2 = I_1 \cos\theta_1$
Therefore:

$$E_1 I_1 \cos\theta_1 = \frac{T \omega_1}{k} = N$$

which is the expression (5) hereabove stated. The equation (5) actually expresses that N is the power fed by the voltage $E_1$ to the section $L_2$, $R_L$ of the equivalent circuit of FIG. 3, e.g. the rotor power. This suggests that N can be obtained through a power calculating analog circuit supplied with signals representing $E_1$ and $I_1$.

More generally, the terms of expression (4) can be related to the motor electrical input quantities. Thus, in accordance with the present invention an indication of the slip is derived by properly processing signals proportional to the motor input currents and voltages. Such processing may be achieved by analog circuitry in various manners. In particular, it is not required that the approximation expressed by equation (2) be used since in certain instances this would not be acceptable. In such case from equation (1) an exact expression of the slip $\omega_2{}^1$ is derived as follows:

$$T = k \frac{E_1{}^2}{\omega_1{}^2} \cdot \frac{\omega_2}{R_2} \text{ with } \omega_2 = \frac{\omega_2{}^1 R_2{}^2}{R_2{}^2 + L_2{}^2 (\omega_2{}^1)^2}$$

Applying the above described general method the quantity $\omega_2$, is obtained and the correct slip frequency $\omega_2{}^1$ can be derived by simple use of non-linear function generation techniques, which are applied by inserting a non-linearity as a corrective factor to the final output signal $\omega_2$ obtained under the approximate equation method.

THE PREFERRED EMBODIMENT OF THE INVENTION

A. Sensing Circuits

Figure 6:
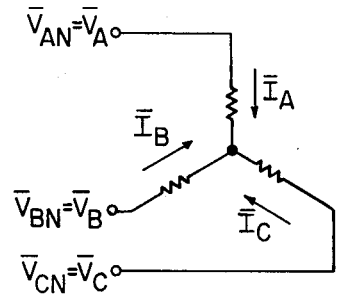
FIG. 6 illustrates the stator power supply of a three-phase induction motor and FIG. 7 shows the corresponding vector diagram.
Figure 7:
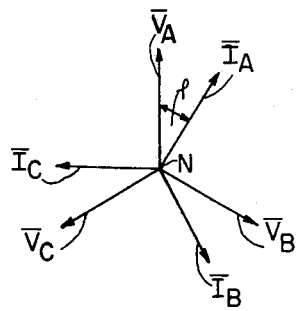

Consideration should be had now to the balanced 3-phase system shown in FIG. 6 and to the vectorial diagram of FIG. 7. A vectorial transformation by reference to the direct and quadrature vectors will now be effected as shown on FIGS. 8 and 9 for the voltage and the currents, respectively. An equivalent system of voltages $V_d$, $V_q$ and $I_d$, $I_q$ is derived in which the voltages and currents are of equal amplitude and in quadrature to each other.

Figure 8:
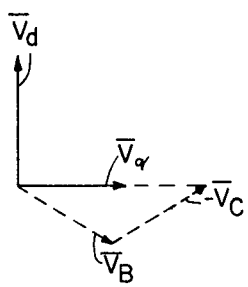
FIGS. 8 and 9 show two-phase phasor diagrams for a three phase voltage supply.
Figure 9:
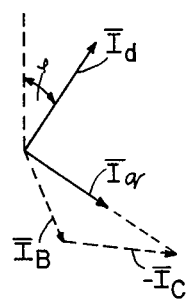

Converter 1 is supplying power to an induction motor M through three phase lines 20, 21, 23 from which the phase currents are sensed, on respective lines 23, 24, 25, and the phase voltages are sensed on respective lines 26, 27, 28. The three phases of the motor are assumed to be in a Y configuration. Referring to FIGS. 8 and 9, the following expressions of the direct and quadrature voltages $V_d$, $V_q$, and of the direct and quadrature currents, $I_d$, $I_q$ are known:

$$V_d = V_A = V\sin \omega_1 t \quad (9)$$
$$V_q = 1/\sqrt{3} (V_B - V_C) = -V\cos\omega_1 t \quad (10)$$
$$I_d = I_A = I\sin (\omega_1 t - \phi) \quad (11)$$
$$I_q = 1/\sqrt{3} (I_B - I_C) = -I\cos (\omega_1 t - \phi) \quad (12)$$

where $V_A$, $V_B$, $V_C$, $I_A$, $I_B$, $I_C$ are the phase voltages and currents.

Figure 10:
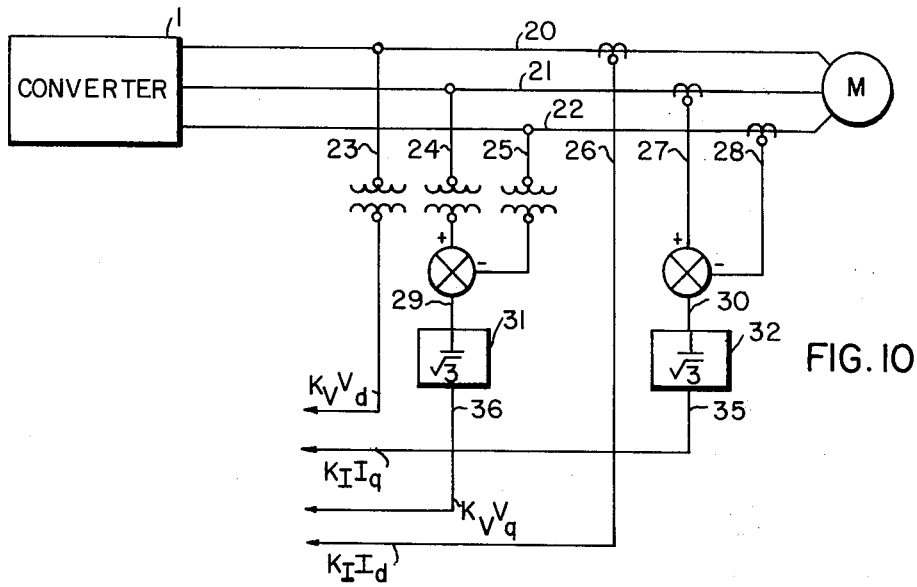
FIG. 10 shows analog circuitry for deriving signals proportional to the direct and quadrature currents and voltages in accordance with the present invention.

Referring to FIG. 10, line 23 supplies $k_v V_d$ directly from phase A (line 20) in accordance with the first of the last four relations. From the two phases B, C, lines 24, 25 provide signal representations of the phase voltages $V_B$, $V_C$ which are subtracted by a summer, the output of which is supplied to an amplifier having a gain of $1/\sqrt{3}$. Therefore, on line 36, a signal characteristic of $k_v V_q$ is obtained in accordance with the second of the last four equations. Similarly, $k_I I_d$ and $k_I I_q$ are provided on lines 26 and 35 in accordance with the two last equations, respectively.

FIGS. 8 and 9 represent the 2-phase system so obtained. The four quantities of the 2-phase system contain all the information present in the 6 quantities of the original 3-phase system. Similarly, in an $n$ phase system, the original $2n$ phasors can be resolved in a set of two orthogonal voltage phasors and two orthogonal current phasors.

Figure 11:
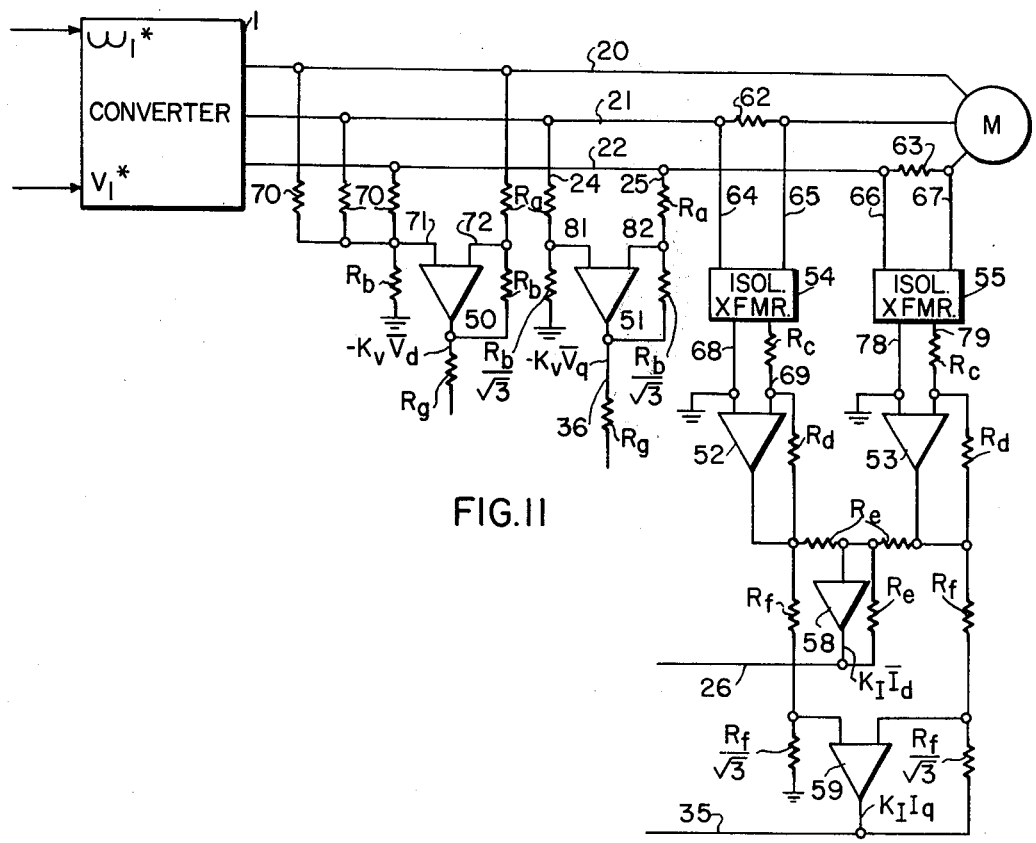
FIG. 11 is a more specific embodiment in relation to the circuit of FIG. 10.

FIG. 11 represents a sensing arrangement for deriving the four signals $k_v V_d$, $k_v V_q$, $k_I I_d$ and $k_I I_q$ where $k_v$ and $k_I$ are sensing scale factors peculiar to the voltage and current derivation circuits, respectively.

The output lines 20, 21 of the inverter 1 to the induction motor 2 are sensed to derive signals proportional to the voltages applied to the motor and to currents circulating in the stator windings thereof. Voltage sensing is accomplished through operational amplifiers 50 and 51. These are wired in a "full differential" amplifier configuration. A resistance value $R_a$ is used as the base resistance for the system. Thus, three identical resistors 70 are provided each of ohmic value 3 $R_a$, wired from each output line 20, 21, 22 to form an artificial neutral network connected to line 71, which is itself connected to the non-inverting input mode of amplifier 50. A resistor of value $R_a$ is also connected between converter output line 20 and the second (inverting) input node of amplifier 50. Two identical resistors of value $R_b$ are also connected respectively between the inverting input node and the output of amplifier 50, and between the non-inverting input node and ground. Therefore, at the output of amplifier 50 an output signal $-k_v V_d$ is derived which is proportional to the line-neutral voltage of line 20 selected as the phase of the direct component $V_d$ of the voltages applied to the motor. The scale factor $k_v$ is a function only of $Ra$ and $Rb$, as indicated by the relation $k_v = R_b/R_a$. The actual values of resistors $R_a$ and $R_b$ depend on the motor voltage level, the characteristics of the operational amplifiers, the levels of the DC supply voltages used in the control circuits, among others. They can easily be given one of many possible values, among which a man skilled in the art of operational amplifiers can easily make the choice. In a typical example, $R_a$ = 300 K $\Omega$ and $R_b$ 32 10 K $\Omega$. These values lead to a scale factor $k_v$ = 1/30 volt per volt.

Similarly, an amplifier 51 is provided to generate a signal proportional to the difference between the voltages of the second and third converter output lines 21 and 22. From these two lines, two identical resistors of value $R_a$ are connected to the two input nodes of amplifier 51. Two identical resistors of value $R_b$ 3 are also connected, one between the inverting node 82 and the output amplifier 51 and the other, between the non-inverting node 81 of amplifier 51 and ground. From the vectorial diagram of FIG. 8 relative to the orthogonal vector system $V_d$, $V_q$, into which the set of motor input voltages can be resolved it appears that the output of amplifier 51 is a signal of the form $-k_v V_q$, with a scale factor $k_v$ having the same value as for the output signal of amplifier 50.

The current sensing arrangement includes two identical shunt resistors 62 and 63, of value $R_s$ (typically 10 milliohm) inserted in series with the second and third converter output lines 21, 22. Isolation transducers 54 and 55 are provided and the small signals developed across the shunts 62, 63, are supplied to the control circuitry with ground as the reference voltage. The isolation transducers in the preferred embodiment have unity gain, although other gain values are possible in other instances. The transducer output signals are amplified through operational amplifiers 52 and 53 with a selected scale factor. The choice of scale factor $k_I$ depends upon the motor current levels and the voltage dynamic range of the processing analog circuitry. This scale factor $k_I$ (typically .1 volt per ampere) is fixed by the choice of the shunt value $R_s$ and of resistors $R_c$ and $R_d$ associated with amplifiers 52 and 53, the relation being: $k_I = R_s (R_d/R_c)$. Typically, $R_d$ = 100 K $\Omega$ and $R_c$ = K $\Omega$.

At the outputs of amplifiers 52 and 53 two signals are generated respectively proportional to the currents in motor lines 21 and 22. From these signals, the two direct and quadrature components $I_d$ and $I_q$ of the motor currents are built up by circuitry as follows.

First, the direct component $I_d$ is obtained through amplifier 58, which performs the summation and inversion of the outputs of amplifiers 52 and 53. For this purpose, three identical resistors $R_c$ are used in conjunction with amplifier 58 (a typical value is 10KΩ), as shown in FIG. 11.

The output of amplifier 58 is the direct motor current component $k_I I_d$ since the inverted sum in fact reconstructs the current signal in the first converter output line 20.

In order to obtain the quadrature component $I_q$, a signal representing the difference between the outputs of amplifier 52 and 53 is derived from operational amplifier 59. The difference signal is used in conjunction with two pairs of identical resistors, $R_f$ and $R_f / \sqrt{3}$ to scale it down by a factor $\sqrt{3}$, as seen from equation (12). Typically, $R_f = 10$ K Ω. Thus, the output of amplifier 59 is the required quadrature component of the current $k_I I_q$.

B. Derivation of the Air Gap Voltage Phasors

To the air gap voltage phasor $E_1$ of FIG. 3 correspond, in the two phase orthogonal system, the two phasors $E_d$ and $E_q$ in quadrature with each other. These phasors are related to the motor input voltages $V_d$ and $V_q$ by the relations $$E_d = V_d - I_d (R_1 + j\omega_1 L_1)$$
$$E_q = V_q - I_q (R_1 + j\omega_1 L_1)$$

Figures 12, 13:
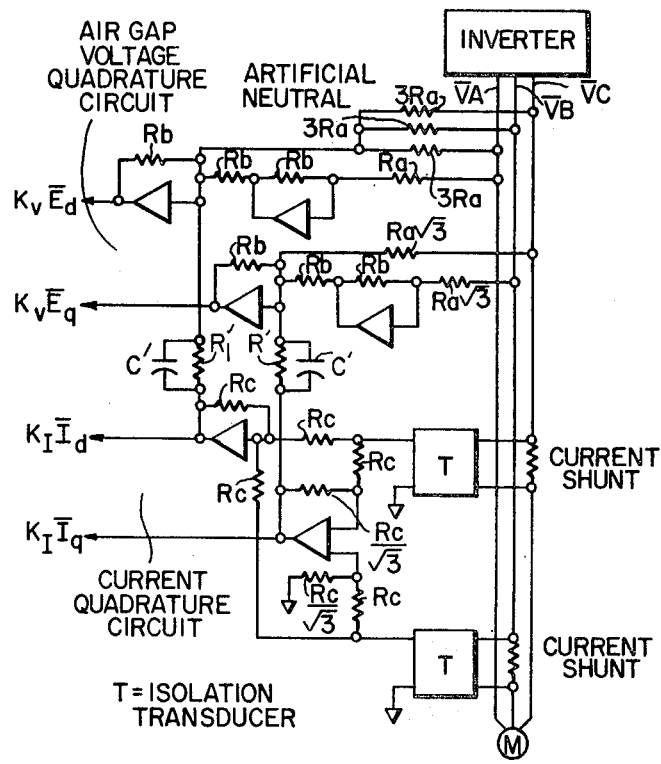
FIG. 12 is a circuit for the derivation by analog circuitry of air gap voltage quadrature components, in accordance with the present invention.
FIG. 13 shows how the numerator N is derived in accordance with the present invention.

Thus, it appears that phasor $E_d$ (or $E_q$) can be obtained by subtracting from the signal proportional to $V_d$ (or $V_q$), in the sensing system, a properly scaled fraction of the signal proportional to $I_d$ (or $I_q$). The scaling factor of the subtraction should include both a real term proportional to $R_1$ and a reactive term proportional to $j\omega_1 L_1$. This can be accomplished, for instance, by coupling to the summing junction of the operational amplifier, which generates $k_v V_d$ (or $k_v V_q$), in FIG. 11, the signal $k_I I_d$ (or $k_I I_q$), through a resistor-capacitor network $R'C'$, as shown in FIG. 12.

$R'$ (ohms) and $C'$ (farads) are related to the stator parameters $R_1$ (ohms) and $L'$ (henries) by the following relations:

$$R' = R_b \, k_I/k_v R_1$$
$$C' = k_v/k_I \cdot L_1/R_b$$

with $k_v$ = voltage sensing scale factor (volts/volt)
$k_I$ = current sensing scale factor (volts/ampere)
$R_b$ = feedback impedance of the operational amplifiers (ohms)

C. Derivation of the Numerator of the Slip Frequency Expression

The numerator N of expression (4) is related to the motor input quantities by equation (5). An analog signal proportional to is derived from the available signals by the use of analog multipliers.

As shown on FIG. 13 the signals $k_v E_d$ and $k_I I_d$ are applied to a first multiplier 10. If $\theta_1$ is the phase angle by which $I_d$ lags over $E_d$, the inputs of the multiplier vary with time according to $$k_v E_d = k_v E_1 \sin (\omega_1 t + \alpha)$$
$$k_I I_d = k_I I_1 \sin (\omega_1 t + \alpha - \theta_1)$$

with $E_1$ = amplitude of the air gap voltage phasor
$I_1$ = amplitude of the stator current phasor $\alpha$ = lag angle between air gap voltage and stator voltage.

Assuming the multiplier has a multiplication scale factor equal to unity for both inputs, the output of multiplier 10 is:

$$k_v k_I E_d I_d = k_v k_I E_1 I_1 \sin(\omega_1 t + \alpha)\sin(\omega_1 t + \alpha - \theta_1) = \tfrac{1}{2} k_v k_I E_1 I_1 \cos\theta_1 - \tfrac{1}{2} k_v k_I E_1 I_1 \cos(2\omega_1 t + 2\alpha - \theta_1)$$

We see that the signal at the output of the multiplier contains the desired term $E_1 I_1 \cos\theta$, and also an undesired signal at twice the applied frequency.

A similar operation is effected with a second multiplier using the signals $k_v E_q$ and $k_v I_q$, given by the following equations:

$$k_v E_q = -k_v E_1 \cos (\omega_1 t + \alpha)$$
$$k_I I_q = -k_I I_1 \cos (\omega_1 t + \alpha - \theta_1)$$

By analogy with multiplier 10, it is seen that at the output of the second multiplier is derived a signal represented by the following expansion:

$$k_v k_I E_q I_q = \tfrac{1}{2} k_v k_I E_1 I_1 \cos\theta_1 + \tfrac{1}{2} k_v k_I E_1 I_1 \cos (2\omega_1 t + 2\alpha - \theta_1)$$

Again this expression contains the desired term $E_1 I_1 \cos\theta_1$ and an undesired ripple at twice the applied frequency. However the ripple here is of opposed phase as compared to the ripple at the output of the first multiplier 10. Therefore, if the output of the multipliers are summed, the ripple cancels out and the net output appears as follows:

$$k_v k_I E_1 I_1 \cos\theta_1 = k_v k_I N$$

In conclusion, the circuitry of FIG. 13 readily permits the generation of an analog output signal which is proportional to N.

D. Derivation of the Denominator of the Slip Frequency Expression

The denominator D of the slip frequency in expression (4), is given by $D = E_1^2/\omega_1$. In accordance with the present invention, a representative analog signal can be derived by techniques of rectification applied to the available air-gap voltage phasors $k_v E_d$ and $k_v E_q$.

Figure 14:
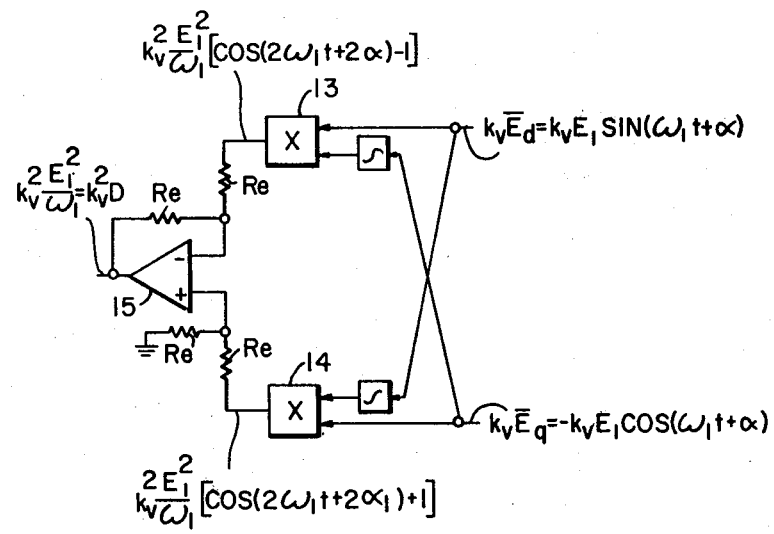
FIG. 14 illustrates analog circuitry for the derivation of the denominator D in accordance with the present invention.

A more simple approach is also proposed in order to avoid squaring the obtained amplitude and effecting a division by $\omega_1$. To this effect analog multipliers are used as illustrated by FIG. 14. To a first multiplier 13 the signal $k_v E_d$ and the time integral of the signal $k_v E_q$ are applied. At the output is derived the desired term $E_1^2/\omega_1$ with a negative polarity, and also a term representing a ripple at twice the applied frequency which is undesirable. To a second multiplier 14, the signal $k_v E_q$ and the time integral of the signal $k_v E_d$ are applied. The desired term $E_1^2/\omega_1$ is again present at the output, but this time with a positive polarity and a second term is also present representing a ripple which is in the phase with the ripple at the output of the first multiplier. By taking the difference between the outputs at the two multipliers the ripple cancels out and D is directly obtained as follows:

$$k_v^2 (E_1^2/\omega_1) = k_v^2 D$$

E. Derivation of a Slip-Frequency Signal

Figure 15:
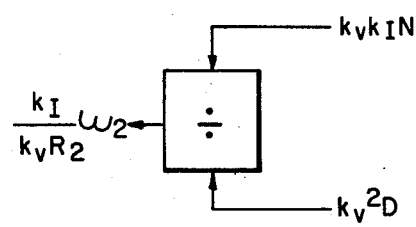
FIG. 15 is a divider circuit used for the derivation of the slip frequency from the analog signals N and D derived in accordance with the present invention.

From the derivation previously obtained, the slip frequency is derived in the form of an analog signal proportional to the motor slip frequency, by applying the analog signals $k_v k_I N$ and $k_v^2 D$ to an analog divider as shown in FIG. 15. The analog circuit in effect performs the following operation in accordance with Equation (4):

$$\frac{k_I}{k_v} \cdot \frac{N}{D} = \frac{k_I}{k_v R_2} \omega_2$$

PRACTICAL CONSIDERATIONS REGARDING THE IMPLEMENTATION OF THE INVENTION

From the hereinabove description of a specific embodiment of the invention, it appears that an indication of the slip frequency of an induction motor is derived only from the knowledge of the input current fed to the motor and the voltage applied to the stator thereof. Another interesting feature of the motor drive according to the present invention stems from the fact that the slip frequency signal is at all times related to the inputted currents and voltages. Therefore, automatic control in a closed loop is very tightly maintained. This would not have been possible with the prior art motor drives since they are not tachometerless, and therefore the controlling signal there derived would have been only a transformation through electromechanical coupling of the original electrical parameters supplied to the motor. Thanks to this feature, the present invention provides for a novel and unique type of induction motor drive.

One of the motor drive controls that can be used in accordance with the present invention is the voltage input motor drive. Another is the current input motor drive. In either case the frequency is considered as an independent variable. Another parameter for control is the voltage of the current input, depending upon which of these two types of motor drive is used. The invention applies also to a motor drive in which the frequency of the power supply is fixed, and the voltage adjustable. With such a drive, the family curves of FIG. 1 show that for a given torque by changing the flux through voltage control various magnitudes of slip frequency can be achieved and as a result the speed frequency may be adjusted by voltage control so as to produce a desired shaft speed. Therefore, it is possible to regulate the operation of the motor under changing torque conditions only by varying the voltage of the supply in response to a derived slip frequency signal. This type of drive could afford a simple and effective control of fans, or pumps, or whenever the torque requirements at low speed are not demanding.

It is also clear from the herein described specific embodiment of the present invention that a synthesized signal representative of the slip frequency of an induction motor can be derived in several different ways under the same general teachings. Thus, if a signal characteristic of the torque T applied to the motor is obtained, the slip frequency $\omega_2$ may be derived from equation (4)

$$\omega_2 = \frac{R_2}{K} \cdot \frac{T\omega_1^2}{E_1^2}$$

since by computation $E_1$, the air gap voltage, is also known. It is another important feature of the present invention to make use of equation (4) in such a way that knowledge of the torque will not be necessary. To this effect an expression proportional to $T\omega_1$ is first computed in the form of a numerator N, which actually is identical to $E_1 I_1 \cos\theta_1$, (the above stated equation (5)). Then, a divider $D = E_1^2/\omega_1$ is computed. From the expressions of N and D it would seem that knowledge of $E_1$ be required. However, this is not necessary since, as shown hereabove, a knowledge of the phase input currents and input voltages would readily provide a knowledge of $E_1$. Thus, the present invention actually proposes to synthesize the slip frequency signal by analog circuitry using only analog inputs representing the input currents and voltages, and taking into account the resistance $R_1$ and the inductance $L_1$ of the stator of the motor as hereabove explained. With this method, analog computation is conducted for N and D successively and a division of the analog signal N by the analog signal D should yield a signal representation of the slip frequency $\omega_2$, as it appears from equation (4).

When computing the term N when the analog computation is effected in relation to a single phase of the input current and voltage, an undesired ripple signal having twice the frequency $\omega_1$ is present in the signal derived since the computation requires a multiplication of $E_1$ by $I_1$ in order to obtain $E_1 I_1 \cos\theta_1$. Such undesired ripple signal, however, can be filtered out. Also when deriving $D_1$ since $E_1$ is required, rectification of $E_1$ will introduce a ripple which can be filtered out before effecting a computation of $E_1^2$ through a squarer followed by a division by $\omega_1$ through a divider. Then N:D is readily obtained to derive $\omega_2$.

Instead of first rectifying $E_1$, then squaring $E_1$, another mode of computing D for a single phase could make use of a multiplier operating on $E_1$. In such a case simple trigonometry will show that while $E_1^2$ is derived, a function of $\cos 2\omega_1 t$ is added thereto. However, this ripple at double the input frequency is easily filtered out, before dividing $E_1^2$ by $\omega_1$ when deriving D.

In general, the computation of N:D is effected for more than one phase. The technique of computation for one phase is readily applicable to several phases and original techniques of simplifications can be introduced in the analog circuitry arrangement. For instance the ripple due to rectification of $E_1$ for one phase or the ripple at double the frequency when squaring directly disappear readily by summation with three symmetrical phases, and $E_1^2$, as well as $E_1^2$, are derived after such summation as if it were for a single phase.

A classical method of vectorial treatment of any multi-phase system consists in reducing such system to an orthogonal two phase system formed of the direct and quadrature vectors $I_d$, $I_q$ and $V_d$, $V_q$ of current and voltage. In such instance, $E_{1d}^2$ and $E_{1q}^2$ are obtained directly by means of squarer and the ripples present at the output are cancelled out by a summation before dividing by $\omega_1$, when D is computed. However, as has been seen from the preferred embodiment when computing D, the use of a divider can be eliminated if instead of multiplying $E_1$ by $E_1$, an integrator of the function $E_1 \sin\omega_1 t$ is used, in order to obtain $E_1/\omega_1 \cos\omega_1 t$, multiplying $E_1$ by $E_1/\omega_1$ readily provides $E_1^2/\omega_1 = D$. Indeed $E_1$ and $E_1/\omega_1$ may be derived by rectification of $E_1$ and of the integrated function thereof. The ripple would be filtered out before multiplication, or cancelled out by summation when computing on several symmetrical phases together.

More generally analog circuitry is readily conceived by a man skilled in the art in order to generate signals representing N and D and to compute the ratio N:D. It will be seen in particular that the preferred embodiment making use of the direct and quadrature components with integrating circuits does not treat these two phases independently but rather crosswise. The reason is that such treatment provides for the cancellation of the ripple signal. Another arrangement can be made in which the summation would always be taken algebraically in order to make such cancellation. By comparison in a multi-phase system, the integration operates between two successive voltage vectors. The integrated phase being the one leading by $\pi/h$ where $h$ is the number of phases.

From the preceding, it can be seen that the description made with the preferred embodiment can be generalized to any number of phases, and that many variations can be made in the analog circuitry arrangement while remaining within the scope of the present invention.

It has also been shown that equation (4) is only an approximation of equation (1). However, equation (4) is generally valid under the conditions usually met in practice. The invention is not limited to such conditions, however and as herein explained, the synthetic signal so derived can be readily corrected so as to match a derivation from the exact relationship of equation (1). To this effect, in accordance with the present invention, at the output of the analog circuit described hereabove, a correcting circuit is connected having a non-linear transfer function such that the slip frequency signal $\omega_2$ derived in accordance with equation (4) becomes a corrected slip frequency signal $\omega_2{}^1$ related to $\omega_2$ by the following relationship:

$$\omega_2 = \frac{\omega_2{}^1 R_2{}^2}{R_2{}^2 + L_2{}^2 (\omega_2{}^1)^2}$$

APPLICATION TO MOTOR DRIVE CONTROL

Variable freqency ac power supplies for induction motor drives can be divided into voltage and current supplies.

If the source impedance of the supply is negligible, it is a voltage supply; if the source impedance is large, it is a current supply. Motors fed from voltage supplies are voltage input drives, while motors fed from current supplies are current input drives. Frequency and voltage, or frequency and current, must be independently adjustable in both types of drives. Since the speed of an induction motor is determined primarily by the frequency, the frequency is considered an independent variable. The loading torque is also an independent variable of a drive. The voltage and current are controlled variables because they are controlled according to requirements set forth by the independent variables. When the motor operates at arbitrary values of the independent variables, it is the controlled variable which must be varied to maintain optimal operating conditions for the motor.

The operation of the motor is optimal when the magnitude of the air gap flux is kept constant at its nominal value. The flux is nominal when the motor is excited by sinusoidal line voltages equal to the motor nameplate value at zero torque.

Apart from the impedance of the variable frequency power supply used, drives may be characterized according to the control techniques by which the reference value of the controlled variable is obtained in order to maintain the flux at a sufficiently constant level. Theoretically, the reference value could be based on flux density measured by flux sensors placed in the motor, but this control technique is not economical. Practical control techniques must rely on data obtained relating to the driving operative conditions of the motor, for instance the slip frequency, usually obtained through speed sensing. In that respect, the invention has been shown as doing away with rotary transducers connected to the motor shaft, and as relying instead on voltage and current transducers located at the power supply. Although the invention is applicable to voltage input drives as well as to current input drives, a preferred application is a tachometerless current input drive.

In such a drive, the ruggedness of the induction motor can be fully utilized, which is one of the considerations in the selection of induction motor drives.

This general technique of ACI current control is based on this property of the induction motor, that if $\omega_2$ is known at any arbitrary speed and the stator current $I_1$ is adjusted as a parameter so as to assume the value defined by FIG. 1, then, the air gap flux of the motor remains constant, thus satisfying the major condition for optimal operation of the motor.

What we claim is:

1. The method of determining the slip frequency $\omega_2$ of an induction motor supplied with current at a frequency $\omega_1$ and imparting a torque T to a load, comprising the steps of:

sensing the value of the input current and the input voltage of the stator of the motor;

determining from said sensed current and voltage values the direct and quadrature input currents $I_d$, $I_q$; and voltages $V_d$, $V_q$;

determining $E_d$ and $E_q$, the direct and quadrature air gap voltages in accordance with the relationship $E_d = V_d - I_d (R_1 + j\omega_1 L_1)$ and $E_q = V_q - I_q (R_1 + j\omega_1 L_1)$, where $R_1$ and $L_1$ are the resistance and inductance of the stator of the motor;

computing at least one of the products $E_d \cdot I_d$ and $E_q \cdot I_q$ to derive a signal N which is substantially proportional to $T\omega_1$;

integrating at least one of said determined direct and quadrature air gap voltages, $E_d$ and $E_q$;

multiplying said integrated one of said air gap voltages by the other of said determined air gap voltages to derive a signal D which is substantially proportional to the square of the corresponding non-integrated determined air gap voltages and inversely proportional to $\omega_1$; and dividing said signal N by said signal D to derive a signal representative of the slip frequency $\omega_2$.

2. The method of claim 1 wherein both determined air gap voltages $E_d$ and $E_q$ are integrated, wherein each integrated determined air gap voltage is multiplied by the opposite one of said determined air gap voltages to provide partial products with the additional step of algebraically summing said partial products to derive said D signal.

3. The method of claim 2 wherein both products $E_d \cdot I_d$ and $E_q \cdot I_q$ are computed, with the additional step of algebraically summing said products to derive said N signal.

4. The method of claim 1 with the additional step of correcting said signal representative of the slip frequency $\omega_2$ through a connective circuit introducing a non-linear corrective factor relating said frequency $\omega_2$ to a corrected frequency $\omega_2{}^1$ as follows:

$$\omega_2 = \frac{\omega_2{}^1 R_2{}^2}{R_2{}^2 + L_2{}^2 (\omega_2{}^1)^2}$$

5. An analog circuit for the derivation of a signal representative of the slip frequency $\omega_2$ of an induction motor supplied with current at a frequency $\omega_1$ via line terminals, comprising:

means responsive to sensed motor input currents and terminal voltages for separately deriving signals representative of the direct current and voltage and of the quadrature current and voltage of the motor;

means responsive to said direct and quadrature current signals and direct and quadrature voltage signals for deriving direct and quadrature air gap voltage signals $E_d$ and $E_q$ in accordance with the functions
$$E_d = V_d - I_d (R_1+j\omega_1 L_1)$$
and
$$E_q = V_q - I_q (R_1+j\omega_1 L_1)$$

first multiplier means responsive to said direct current and direct air gap voltage signals to effect a multiplication thereof;

second multiplier means responsive to said quadrature current and quadrature air gap voltage signals to effect a multiplication thereof;

first means for summing the outputs of said first and second multiplier means for deriving a signal representative of $N = E_1 I_1 \cos\theta_1$ where $E_1$ is the air gap voltage of the motor, $I_1$ the stator current and $\theta_1$ the angle between vectors $E_1$ and $I_1$;

first and second integrator means responsive to said direct and quadrature air gap voltages, respectively;

third multiplier means responsive to said direct air gap voltage and to said second integrator means;

fourth multiplier means responsive to said quadrature air gap voltage and to said first integrator means;

second means for summing the outputs of said third and fourth multiplier means for deriving an algebraic sum thereof providing a signal representative of $D = E_1^2/\omega_1$; and means for dividing said N representative signal by said D representative signal for generating said motor slip representative signal $\omega_2$.

* * * * *